United States Patent [19]
Hinson

[11] Patent Number: 6,094,825
[45] Date of Patent: Aug. 1, 2000

[54] COMBINATION WEEDER/EDGER/TRIMMER

[76] Inventor: Victor H. Hinson, 1005 W. Lucas St., Florence, S.C. 29501

[21] Appl. No.: 09/241,865

[22] Filed: Feb. 2, 1999

Related U.S. Application Data

[60] Provisional application No. 60/074,652, Feb. 13, 1998.

[51] Int. Cl.⁷ ............................................. A01D 34/416
[52] U.S. Cl. ................................. 30/276; 30/347; 56/295
[58] Field of Search ........................ 30/276, 347; 56/12.7, 56/295

[56] References Cited

U.S. PATENT DOCUMENTS

| | | | |
|---|---|---|---|
| 3,831,278 | 8/1974 | Voglesonger | 30/276 |
| 4,054,992 | 10/1977 | Ballas et al. | 30/276 |
| 4,054,993 | 10/1977 | Kamp et al. | 30/276 |
| 4,062,114 | 12/1977 | Luick | 30/276 |
| 4,068,376 | 1/1978 | Briar | 30/276 |
| 4,086,700 | 5/1978 | Inada | 30/276 |
| 4,118,865 | 10/1978 | Jacyno et al. | 30/276 |
| 4,145,809 | 3/1979 | Proulx | 30/276 |
| 4,253,238 | 3/1981 | Sheldon | 30/276 |
| 4,295,324 | 10/1981 | Frantello et al. | 56/12.7 |
| 4,571,831 | 2/1986 | White, III | 30/276 |
| 4,756,146 | 7/1988 | Rouse | 56/12.7 |
| 4,805,306 | 2/1989 | Baba | 30/276 |
| 5,048,278 | 9/1991 | Jones et al. | 56/295 |
| 5,406,708 | 4/1995 | Stephens et al. | 30/276 |
| 5,615,543 | 4/1997 | Caffey et al. | 56/295 |
| 5,623,765 | 4/1997 | Ner-Gaon | 30/276 |
| 5,651,418 | 7/1997 | Jerez | 172/14 |
| 5,659,964 | 8/1997 | Lawrence | 30/347 |
| 5,979,064 | 11/1999 | Kitz et al. | 30/347 |

FOREIGN PATENT DOCUMENTS

| | | |
|---|---|---|
| 1443641 | 7/1976 | United Kingdom . |
| 2125668 | 3/1984 | United Kingdom . |

*Primary Examiner*—Hwei-Slu Payer
*Attorney, Agent, or Firm*—Richard C. Litman

[57] ABSTRACT

A cutting assembly adapted for use in line trimmers that employ either a spooled filament or a fixed filament. The cutting assembly comprises a cutting filament consisting of a stainless steel filament coated with a polymeric elastomer, steel tube-type collar stops, and allen head set screws. The cutting performance and capabilities of commercially available vegetation trimmers can be substantially improved by replacing their cutting assembly with the instant cutting assembly. The cutting filament does not have a point of attachment within the rotating housing hub located on the bottom of the trimmer, thereby enabling the cutting filament to better follow the rotation of the hub, and thereby improve the overall cutting ability of the trimmer.

4 Claims, 8 Drawing Sheets

COMBINATION WEEDER/EDGER/TRIMMER

CROSS-REFERENCE TO RELATED APPLICATION

This application claims the benefit of U.S. Provisional Patent Application Serial No. 60/074,652, filed Feb. 13, 1998.

BACKGROUND OF THE INVENTION

1. Field of the Invention

The present invention relates to an improved cutting head for line trimmers used to cut vegetation; in particular, the present invention is an improved cutting assembly adapted for use in either spooled or fixed length filament line trimmers.

2. Description of Related Art

Commercially available line trimmers employ one of two methods to achieve their goal of vegetation cutting. Some line trimmers have a spooled filament, wherein the filament is supplied by a spool located in the interior of the line trimmer housing. Other line trimmers have a fixed length filament that is anchored at a point in the interior of the line trimmer cutting head.

In line trimmers that have a spooled filament, fresh filament is supplied by a spool either automatically or manually. Fresh filament is needed when the filament being used is accidentally cut or becomes worn out from repeated use. However, restoring the length of cutting filament can be a tedious process because tangling of the cutting filament commonly occurs. Furthermore, when a spool of filament has been exhausted, the spool must be replaced with a new spool of filament.

Fixed line trimmers have cutting heads that contain cutting filaments of a discrete length. The fixed length filament is attached to an inner portion of the cutting head, such that the free end of the filament will be extended into proper cutting position by centrifugal force caused by rotation of the cutting head. Some fixed line trimmers require that a portion of the cutting head be disassembled in order to install a new cutting filament when the previous filament becomes worn or shortened through repeated use. Fixed line trimmers that do not require disassembly of the cutting head to install a new filament often require that the cutting filament have a specific shape, or require careful manipulation of the cutting filament in order to secure the filament to the cutting head. The cutting assembly of the present invention addresses these, as well as other problems often associated with line trimmers found in the prior art, as exemplified as follows.

U.S. Pat. No. 4,054,993 issued on Oct. 25, 1977 to Walter B. Kamp et al. describes a rotary cutting assembly for cutting vegetation with a spooled, flexible, whirling flail. The cutting assembly comprises an elongated linear shaft extending along a rotatable vertical axis, a horizontal base-plate in co-rotatable association with the lower part of the shaft, retainer means attached to the base-plate, and an elongated horizontal flexible flail that extends radially outwardly from the retainer means along a horizontal axis. The flail is constructed from a resinous material and consists of a central core and an external contoured surface of varying cross-sectional sizes formed by prominent protuberances surrounding the central core.

U.S. Pat. No. 4,145,809 issued on Mar. 27, 1979 to Raymond E. Proulx describes a cutting head for rotary mowers, trimmers, and edgers having a rotating body from which spooled, flexible, flail-like filamentous cutting blades extend radially therefrom. The flail-like cutting blades are made of a polymer such as nylon monofilament. The flail-like cutting blades exit from the rotating body through grommets. The cutting head has raised ramp portions alongside each grommet to protect the grommet. The top of the rotating body has sharp-edged radial ribs that operate to deter weed and grass stems from wrapping and binding about the upper portion of the rotating body.

U.S. Pat. No. 4,223,441 issued on Sep. 23, 1980 to Robert G. Everts describes a rotary vegetation cutter comprising a spooled flail attached to a rotor. The flail comprises a plurality of metal filaments braided into an elongated strand, wherein an abradable jacket surrounds the strand. The jacket is made of an abradable material so it can wear off at the tip and expose the metal filaments.

U.S. Pat. No. 4,571,831 issued on Feb. 25, 1986 to Donald M. White, III describes a fixed length of non-metallic filament mounted to a cutting head capable of rapid rotation. The cutting head contains a filament retainer cup that has two diametrically opposed V-shaped slits used to secure the fixed length filament. The cutting head also contains abutments that prevent vibrations caused by the filament contacting vegetation from migrating inwardly to the retention points of the V-shaped slits which causes an excessive build-up of heat that would damage the filament.

U.S. Pat. No. 4,756,146 issued on Jul. 12, 1988 to Russell V. Rouse describes a fixed plastic cutting line trimmer head for cutting vegetation. The trimmer head consists of a pair of overlying sheet steel circular plates welded together to form two or more pairs of partially circular passages between the plates opening at each end into a recess extending continuously at and between the periphery of the plates. The passages are formed by recesses formed in the plates in registry with each other while the peripheral recess is formed by outwardly flared portions of the plates. A fixed length of cutting line is placed into both passages by inserting the end of the line into the adjacent ends of the passages, and sliding the opposite end portions through the passages until they emerge from the remote ends of the passages, with an intermediate portion of the line engaged against a land located between the adjacent passage ends.

U.S. Pat. No. 5,615,543 issued on Apr. 1, 1997 to Hyram J. Caffey et al. describes a rotary cutting head adapted for attachment to conventional line trimmers. The rotary cutting head consists of a cutting disk having a circular plate and a peripheral side wall integral with the circular plate. The peripheral side wall has a pair of integral gussets, each having a pair of radial bores that pass through the side wall. A flexible cutting filament of a thermoplastic material is frictionally engaged within each pair of radial bores such that one end of the cutting filament extends outwardly from the peripheral side wall. The cutting filament consists of a flexible shaft portion that has an integral retaining flange at one of its ends. The retaining flange is formed by contacting one end of the filament with a sufficiently heated surface to permit localized melting of the thermoplastic material at the point of contact with the heated surface. The retaining flange secures the cutting filament to the cutting head.

U.S. Pat. No. 5,671,536 issued on Sep. 30, 1997 to Robert G. Everts et al. describes a spooled line trimmer head having a line feed configuration that facilitates automatic reloading of the trimmer head with new line without requiring removal of the spool from the housing. The line is received into the housing through an eyelet on the housing and is secured in a hole formed on a flange of the spool. The line is wound around the spool while the spool remains inside the housing.

None of the above inventions and patents, taken either singly or in combination, is seen to describe the present invention. The aforementioned prior art does not describe a cutting assembly lacking a point of attachment directly within the cutting head hub, wherein the cutting assembly is attached to the hub through apertures in the housing wall of the cutting head hub, thereby enabling the cutting assembly and cutting head hub to rotate as a single unit. Therefore, there exists a need for a cutting assembled that is easily installed and readily adaptable to accommodate either spooled or fixed length filament containing conventional line trimmers. The vegetation cutting capabilities of commercially available line trimmers can be substantially improved by substituting their original cutting means with the cutting assembly of the present invention.

SUMMARY OF THE INVENTION

Accordingly, it is a principal object of the invention to provide a cutting assembly that is durable, reliable, and easy to install and change.

It is another object of the invention to provide a cutting assembly that when inserted into commercially available trimmers dramatically improves the cutting performance of the trimmer.

It is an object of the invention to provide improved elements and arrangements thereof in a cutting assembly for the purposes described which is inexpensive, dependable and fully effective in accomplishing its intended purposes.

To meet the above objectives, the present invention provides a cutting assembly comprising a vegetation cutting means, a containment means to confine the cutting means to the interior of the rotatable hub of the cutting head, and a securing means to secure the containment means to the cutting means. The cutting filament is strong and durable, and preferably composed of a stainless steel core coated with a polymeric material. The present invention has superior rotational and translational kinematics over prior art cutting heads, because the cutting filament of the present invention has no point of attachment inside the cutting head hub. Therefore, the rotational and translational motion of the cutting filament completely mimics the rotational and translational motion of the cutting head hub.

The cutting filament of the present invention has an increased longevity when compared the cutting filaments disclosed in the prior art, because heat is generated at the fixed end of the prior art cutting filaments as a result of inwardly transmitted vibrations of the cutting filament due to the impact of the cutting filament with the vegetation being cut. This heat causes the prior art cutting filament to rapidly deteriorate and the operational life of the cutting filament is severely shortened. However, since the cutting filament of the present invention is not fixed, but can freely vibrate, the vibrations of the cutting filament of the present invention do not generate heat because the vibrations are dissipated along the length of the cutting filament.

The present invention has outstanding vegetation cutting abilities because of the synchronous uniform rotational motion of the cutting filament and the cutting head hub.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
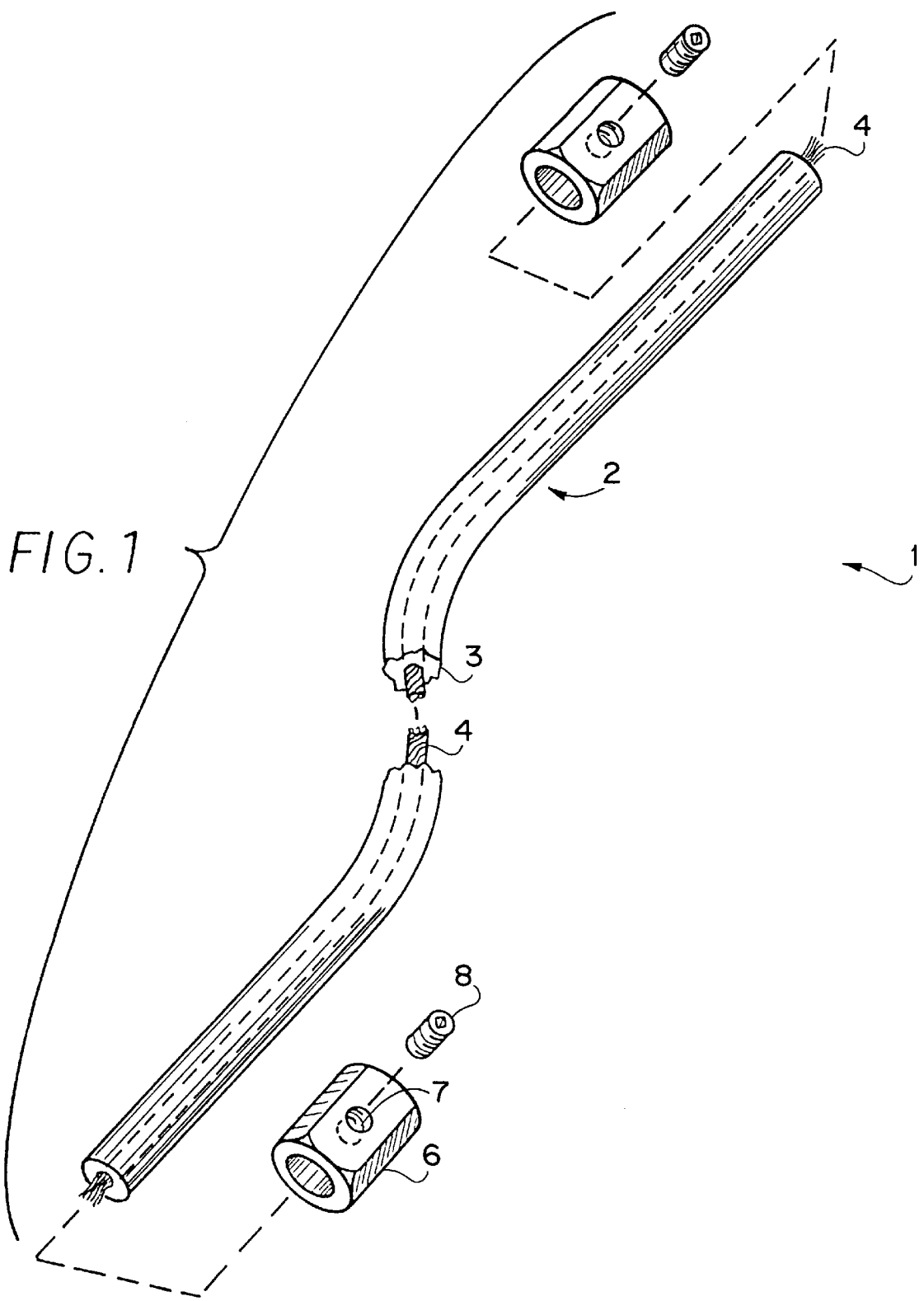
FIG. 1 is an exploded, perspective view of a cutting assembly with a portion of the cutting filament cutaway to reveal the metallic interior of the present invention.

Referring to FIG. 1, the individual components of the cutting assembly 1 are shown. FIG. 1 shows the cutting filament 2, wherein a segment of the cutting filament 2 has been removed in order to reveal the composite structure of the cutting filament 2. The cutting filament 2 comprises a metallic core 4 covered with a polymer coat 3.

The composite structure of the cutting filament 2 provides the cutting filament 2 incredible toughness and durability, while simultaneously providing the cutting filament 2 with needed flexibility. The metallic core 4 of the cutting filament 2 provides the cutting assembly 1 optimal vegetation cutting ability, while the polymer coat 3 helps to prevent the problem seen in the prior art of possible injury to the operator, or to bystanders, due to metal fragments that break away from a completely metallic cutting filament during operation of the line trimmer. The polymer coat 3 also imparts flexibility to the cutting filament 2 that helps the filament reach optimum rotational velocity during vegetation cutting.

FIG. 1 also shows how the cutting filament 2, collar stops 6, and set screws 8 are assembled to construct the cutting assembly 1. The metallic core 4 of the cutting filament 2 is preferably made of stainless steel, while the polymer coat 3 is preferably made of vinyl. The end portions of the metallic core 4 of the cutting filament 2 are exposed and not coated with the polymer coat 3. One way in which the metallic core 4 becomes exposed is by cutting the filament 2 from a piece of standard vinyl coated stainless steel cable. The exposed end portions of the metallic core 4 serve to enhance the vegetation cutting ability of the cutting filament 2 because a small portion of the tough and durable metal core 4 can contact the vegetation during cutting.

In an alternate embodiment, the end portions of the metallic core 4 of the cutting filament 2 are capped (not shown) by dip coating with a non-abradable polymeric material, such as a polyurethane elastomer. The presence of the polyurethane elastomer caps does not diminish the cutting ability of the cutting filament 2 because of the toughness of the polyurethane elastomer. Both capped and uncapped cutting filaments 2 are extremely effective in cutting weeds, weed stems, tall grass, and other vegetation.

The collar stops 6 are preferably steel tube-type collar stops with screw bolt threads having inside diameters of ¼" or ⁵⁄₁₆". There is a threaded opening 7 on the side of each collar stop 6 for receiving an allen head set screw 8 and an unthreaded bore 5 through the collar stop 6 for insertion of the cutting filament 2.

The cutting filament 2 is preferably derived from either (7×19) or (7×7) standard vinyl coated stainless steel cable; however, any suitably coated or uncoated stainless steel cable can also be used. In a preferred embodiment, an uncoated stainless steel cable is dip coated with a polyurethane elastomer. The standard (7×19) strand of stainless steel cable comprises 7 (seven) metal filaments per bundle with 19 (nineteen) bundles per strand of cable. The standard (7×7) strand stainless steel cable comprises 7 (seven) metal filaments per bundle with 7 (seven) bundles per strand of cable.

The diameter of the metallic core 4 in the (7×19) strand cable is preferably ⅛", and the diameter of the cable (metallic core plus polymer coating) is preferably ³⁄₁₆". The diameter of the metallic core 4 in the (7×7) strand cable is preferably ³⁄₃₂"and the diameter of the cable is preferably ³⁄₁₆".

Figure 2:
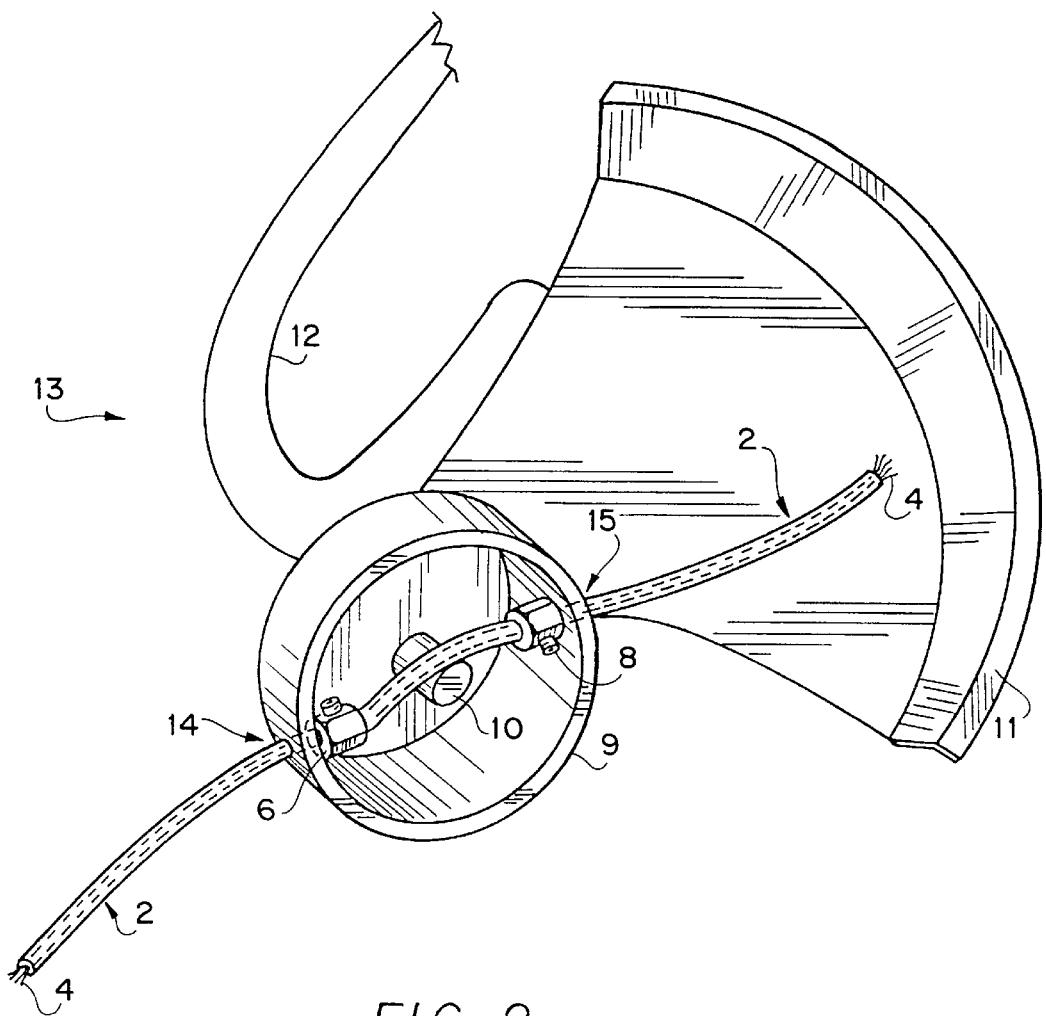
FIG. 2 is a perspective view of a preferred embodiment of the present invention showing the cutting assembly installed in a cutting head hub having a pair of openings.

FIG. 2 shows a commercially available line trimmer 13 wherein the cutting means has been replaced with cutting assembly 1 of the present invention. FIG. 2 also shows that the preferred embodiment has a rotatably cutting head hub 9 with two openings (14,15) located directly opposite to each other. Each end of the cutting filament 2 passes through one of the two diametrically opposite apertures (14,15). The cutting head comprises the cutting assembly 1 and the rotatably cutting head hub 9 that houses the cutting assembly 1.

As depicted in FIG. 2, the cutting filament 2 is not secured within the cutting head hub 9, as commonly seen in prior art line trimmers, but is attached to the hub where the filament 2 passes through the wall of the hub at apertures (14,15). The two collar stops 6 confine the cutting filament 2 to the hub 9 of the cutting head and prevent any lateral movement by the cutting filament 2 that could result in the cutting filament 2 becoming dislodged from the cutting head hub 9. For optimum performance of the cutting assembly 1, the midpoint of the cutting filament 2 must be situated in the center of the cutting head hub 9, resulting in the two exposed portions of the cutting filament 2 that reside outside the cutting head hub 9 to be of equal length.

FIG. 2 also shows the external portion of the shaft 12, the internal portion (inside the cutting head hub 9) of the shaft 10, and a protective shield 11 to prevent the cutting filament 2 from contacting the user. The internal portion of the shaft 10 is preferably covered with a plastic cap (not shown). The cutting head hub 9 can have a detachable bottom cover (not shown), wherein the cutting ability of the cutting assembly 1 is unaffected by the presence or absence of the detachable bottom cover.

Figure 3:
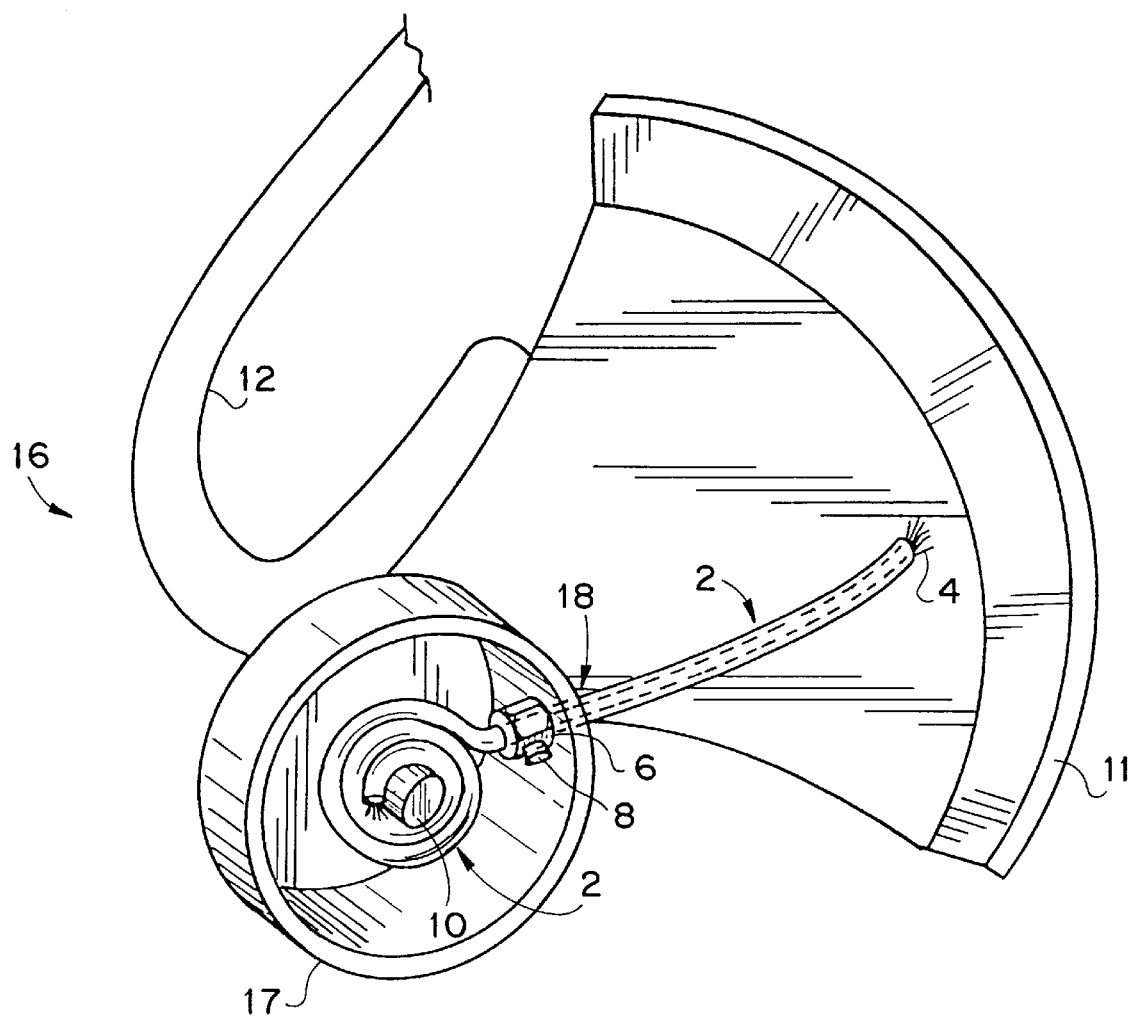
FIG. 3 is a perspective view of an alternate embodiment of the present invention showing the cutting assembly installed in a cutting head hub having a single opening.

FIG. 3 shows an alternate embodiment of the cutting assembly 1 installed in a line trimmer 16, having a single opening 18 in the cutting head hub 17. One end of the cutting filament 2 is wrapped around the portion of the shaft 10 that resides inside the cutting head hub 17. The internal portion of the shaft 10 is covered with a plastic cap (not shown) The opposite end of the cutting filament 2 extends through the single opening 18 of the cutting head hub 17.

The segment of the cutting filament 2 wrapped around the internal portion of the shaft 10 is not attached or secured to the shaft 10. The detachable bottom cover of the cutting head is not required to retain the wrapped portion of the cutting filament 2 inside the hub 17 because the rotational velocity of the cutting head hub 17 is sufficient to keep the portion of the cutting filament 2 wrapped around the internal portion of the shaft 10 inside the cutting head hub 17.

The cutting ability of the embodiment depicted in FIG. 3 is not diminished by using only one end of the cutting filament 2, but by using only one end of cutting filament 2, the useful life of the cutting filament 2 can be almost double in length. The longevity of the cutting filament 2 is a consequence of using only one end of the cutting filament 2 at a time. Once the exposed end of the cutting filament 2 has become worn, the unexposed end of the cutting filament 2 is unwrapped from around the internal portion of the shaft 10 and extended through the single aperture 18 to form the new cutting edge. The worn end of the cutting filament 2 is wrapped around the internal portion of the shaft 10. Therefore, the useful life of the cutting filament 2 is almost doubled, resulting in a significant decrease in replacement and operating costs.

Figure 4B:
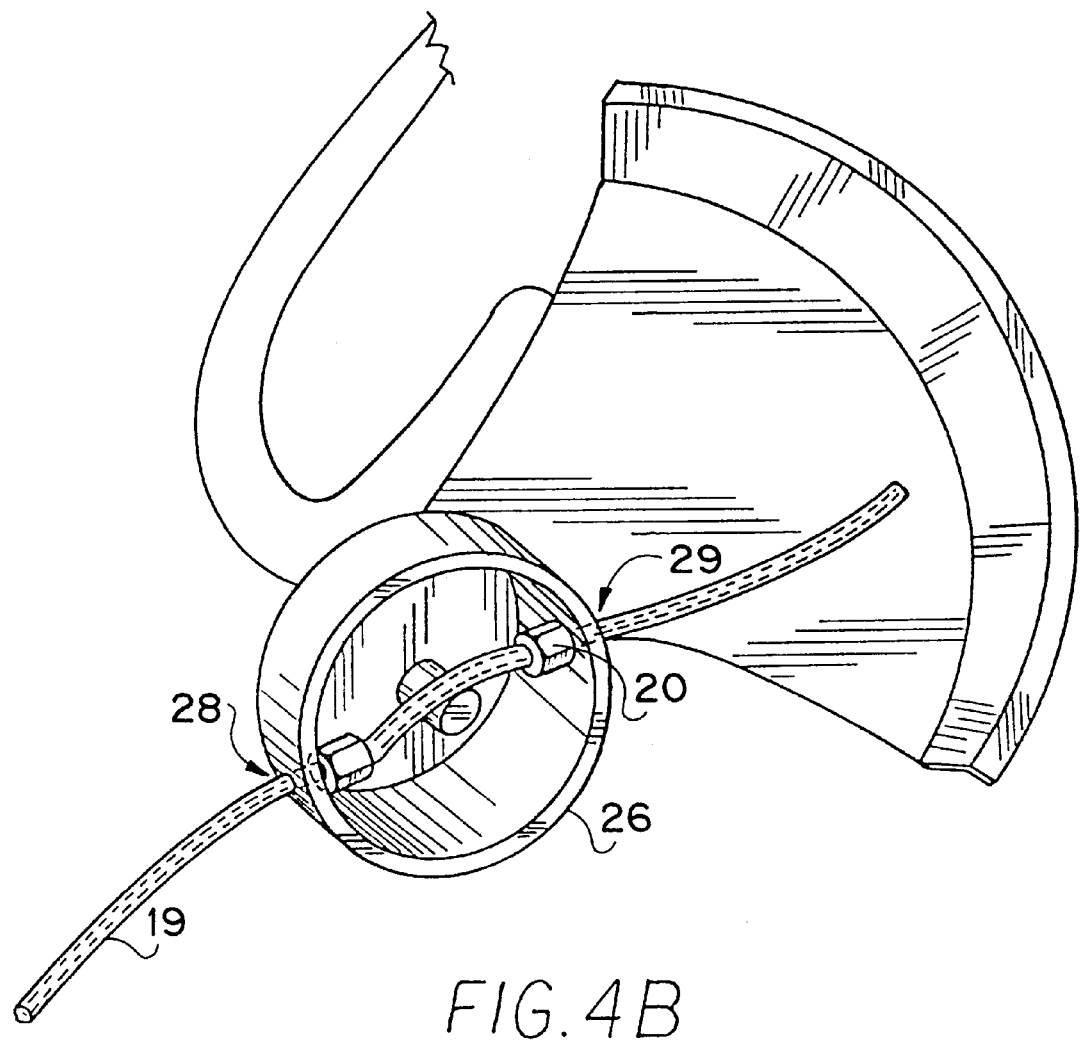
FIG. 4B is a perspective view of a third embodiment of the cutting filament installed in a cutting head hub having a pair of openings according to the present invention.
Figure 4A:
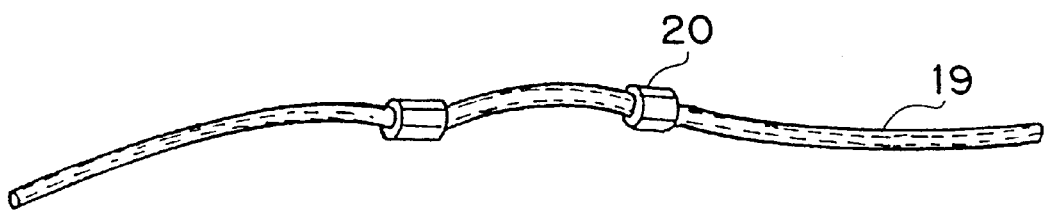
FIG. 4A is a perspective view of a third embodiment of the cutting filament according to the present invention.

FIGS. 4A and 4B shows a perspective view of a third embodiment of the cutting filament 19. The cutting filament 19 depicted in FIG. 4A comprises a hexagonal shaped nylon copolymer line. A pair of hexagonal crimps 20 are used to confine the cutting filament 19 to a cutting head hub 26 having a pair of openings (28,29). In a preferred embodiment, wherein the hub 26 has a 4" diameter, the hexagonal shaped nylon copolymer line 19 is preferably 17.25"in length, wherein the portion of the nylon line 19 inside the hub 26 has a preferred length of 4.375"; the round blank crimp 20 has a preferred outer diameter of 0.25" and a preferred inner diameter of 0.166", and a preferred length of 0.310". In another preferred embodiment, wherein the hub 26 has a 3" diameter, the hexagonal shaped nylon copolymer line 19 is 15.25" in length with the portion of the nylon line 19 inside the hub 26 having a length of 3.25" and the round blank crimp 20 has an outer diameter of 0.25", an inner diameter of 0.145", and a length of 0.370".

Figure 5:
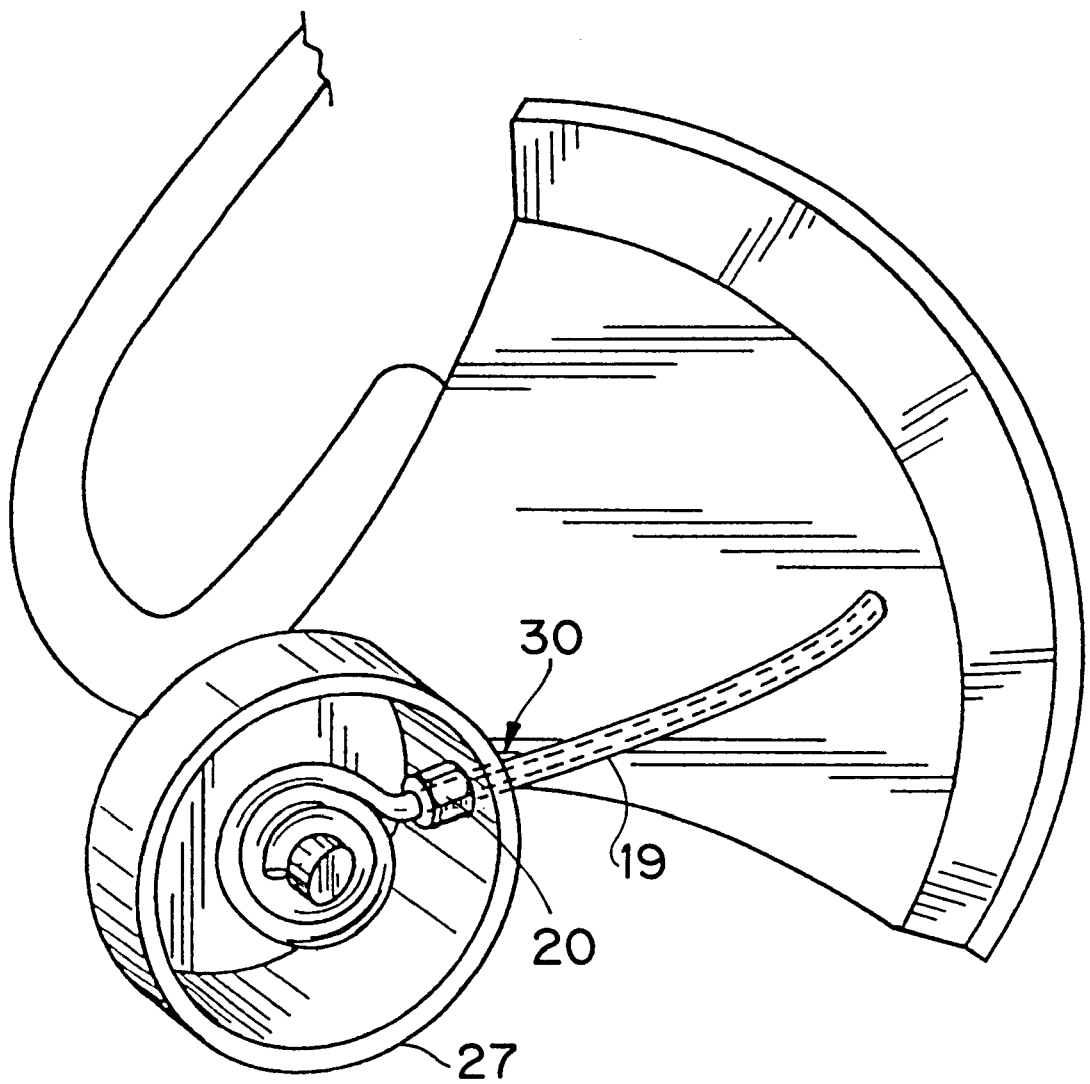
FIG. 5 is a perspective view of a third embodiment of the cutting filament installed in a cutting head hub having a single opening according to the present invention.

FIG. 5 shows a perspective view of a third embodiment of the cutting filament 19 installed in a cutting head hub 27 having a single opening 30. A single hexagonal crimp 20 is used. In a preferred embodiment for a line size of 0.105", the crimp 20 has an outer diameter of 0.186", an inner diameter of 0.117", and a length of 0.370" is used. For a line size of 0.130", the crimp 20 has an outer diameter of 0.250", an inner diameter of 0.145", and a length of 0.370" is used.

Figure 6B:
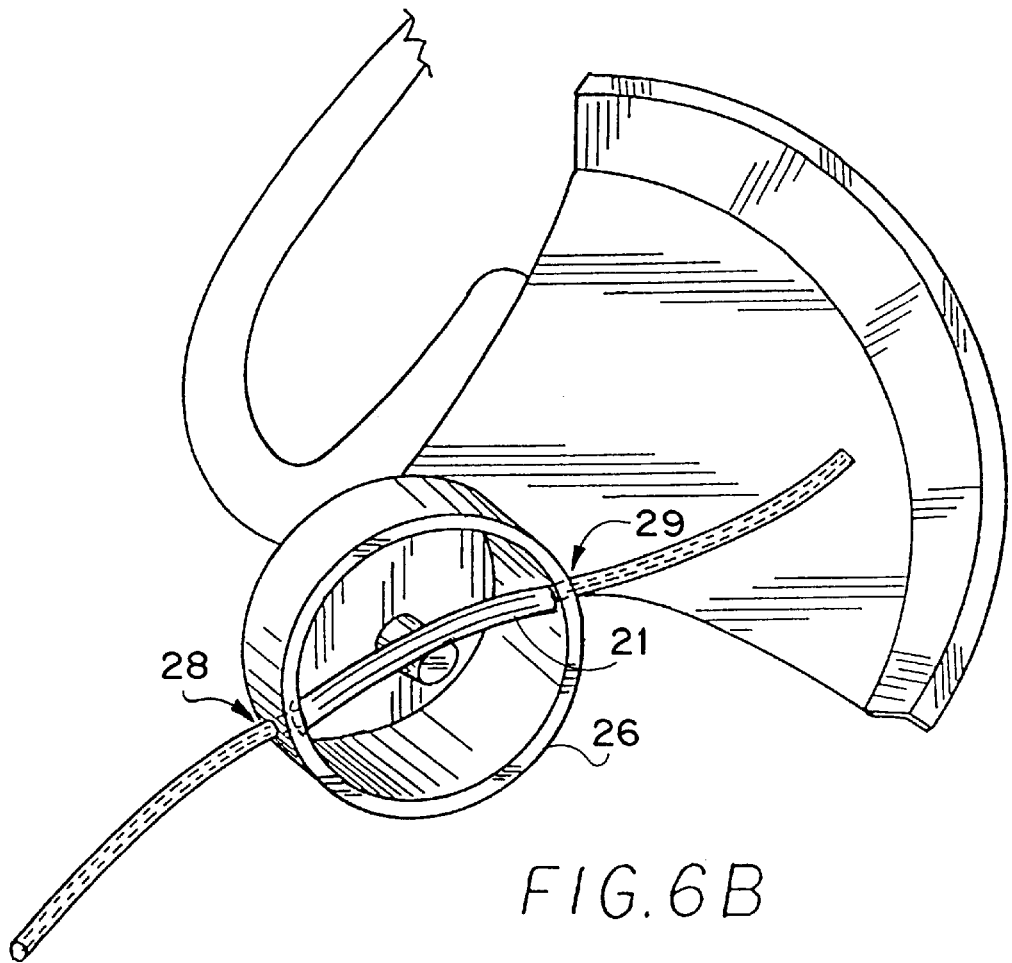
FIG. 6B is a perspective view of a fourth embodiment of the cutting filament installed in a cutting head hub according to the present invention.
Figure 6A:
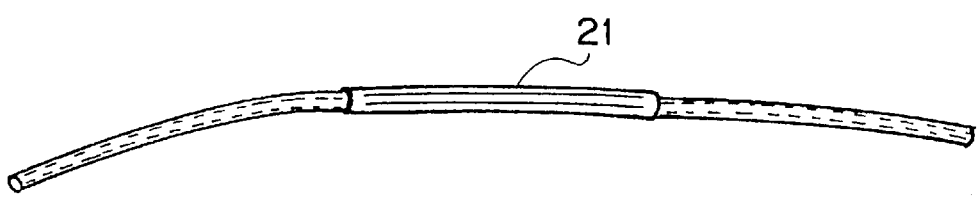
FIG. 6A is a perspective view of a fourth embodiment of the cutting filament according to the present invention.

FIG. 6A shows a perspective view of a fourth embodiment of the cutting filament 21 whereby the cutting filament 21 is a cast molded single piece of nylon copolymer with the center portion of the cutting filament 21 having a larger diameter than the lateral portions of the cutting filament 21. FIG. 6B is a perspective view of the fourth embodiment of the cutting filament 21 installed in a cutting head hub 26 having a pair of openings (28,29). The larger diameter central portion of the cutting filament 21 serves to confine the cutting filament 21 to the cutting head hub 26.

Figure 7B:
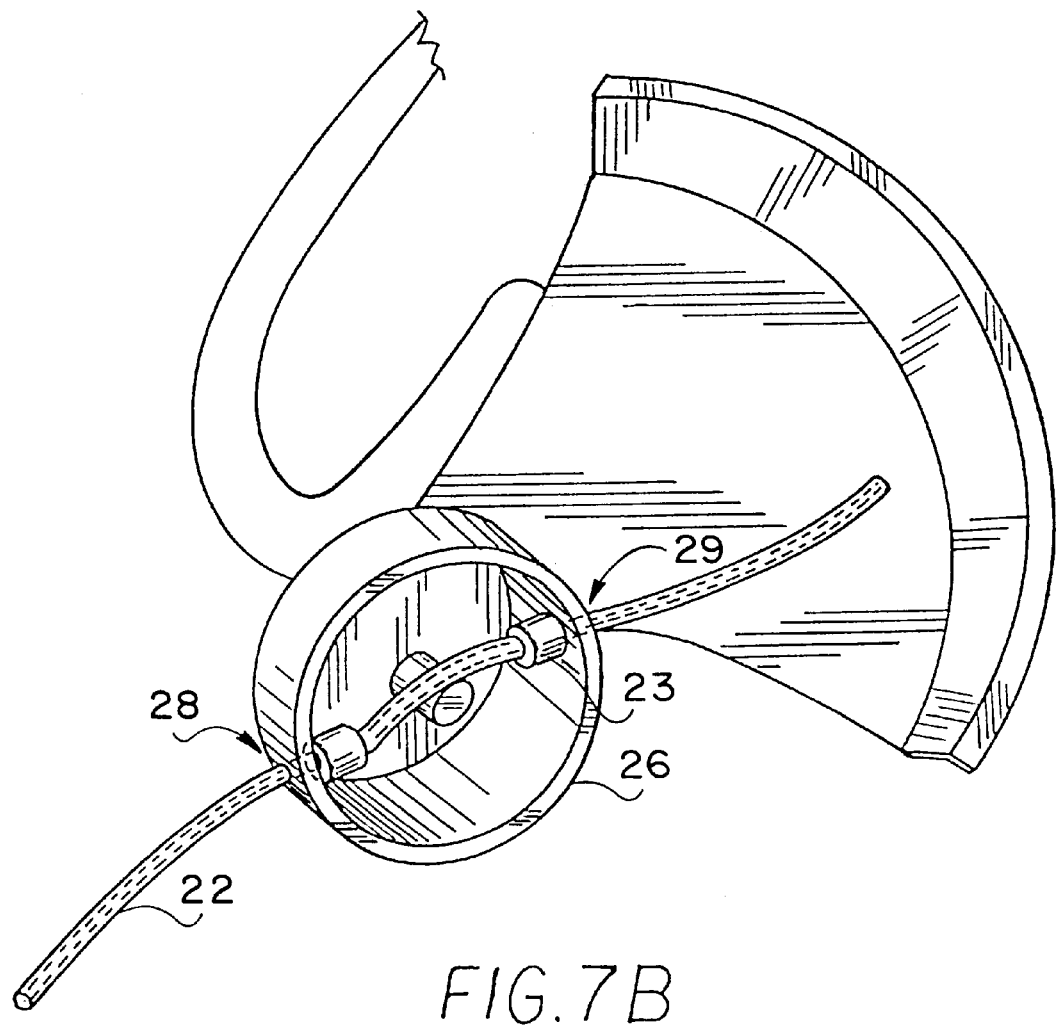
FIG. 7B is a perspective view of a fifth embodiment of the cutting filament installed in a cutting head hub according to the present invention.
Figure 7A:
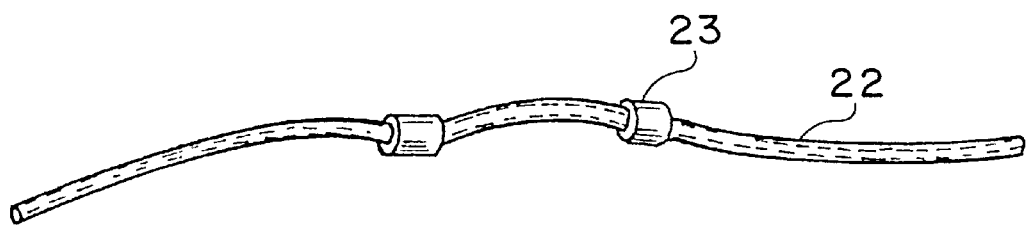
FIG. 7A is a perspective view of a fifth embodiment of the cutting filament according to the present invention.

FIG. 7A shows a perspective view of a fifth embodiment of the cutting filament 22 using a pair of round crimps 23. FIG. 7B shows a perspective view of the fifth embodiment of the cutting filament 22 installed in a cutting head hub 26 through apertures (28,29).

Figure 8B:
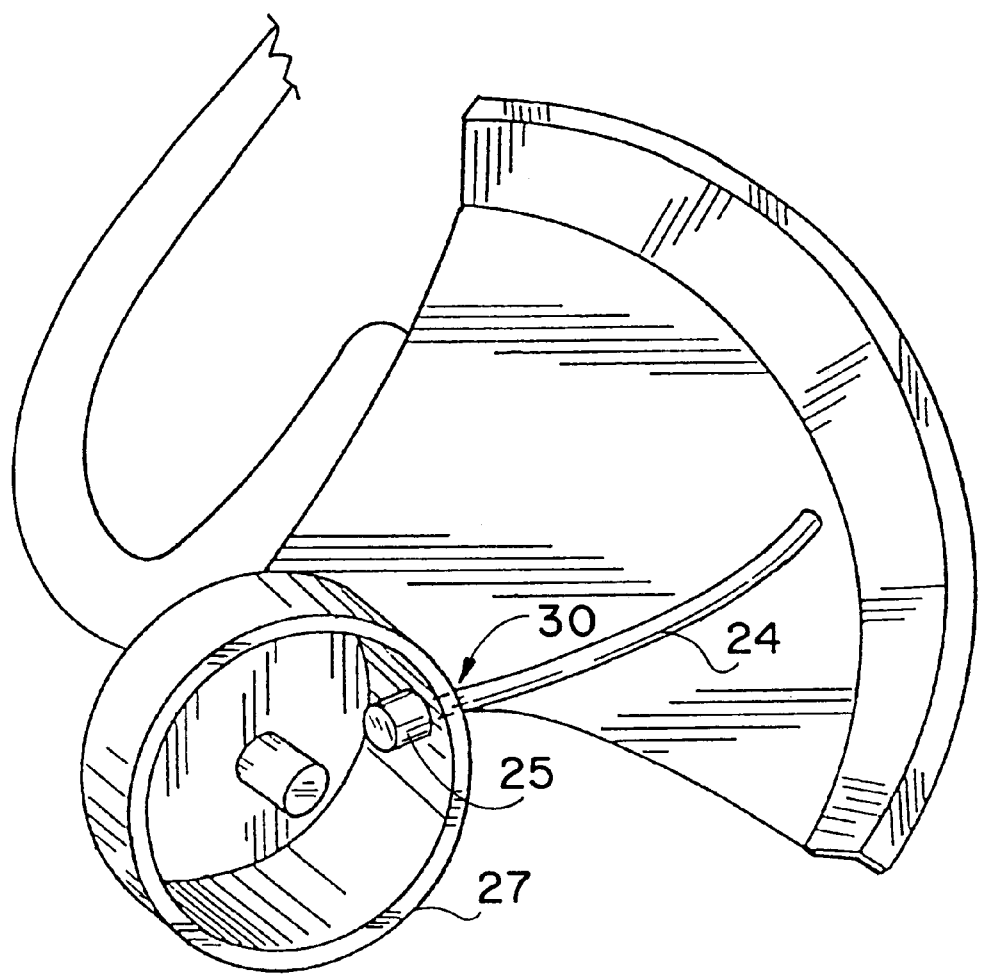
FIG. 8B is a perspective view of a sixth embodiment of the cutting filament installed in a cutting head hub according to the present invention.
Figure 8A:
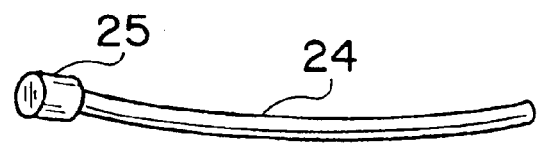
FIG. 8A is a perspective view of a sixth embodiment of the cutting filament according to the present invention.

FIG. 8A shows a perspective view of a sixth embodiment of the cutting filament 24 with a crimp 25 at one end of the cutting filament 24. The crimp 25 is preferably made from aluminum, steel or plastic. FIG. 8B shows a perspective view of the sixth embodiment of the cutting filament 24 installed in a cutting head hub 27 having a single opening 30.

The nylon copolymer filament can be used in a variety of sizes and/or shapes. Possible-line shapes, when viewed in cross-section, include hexagonal, round, square, or star. Possible line sizes include 0.095", 0.105", 0.130", 0.140", 0.150", or 0.155". The cutting filament of the present invention can also be a single solid molded nylon copolymer line, or a nylon copolymer line having plastic crimps, epoxy glue crimps, heat melt crimps, or bonded crimps.

The present invention substantially increases the useful life of a cutting filament, for example with conventional spooled line trimmers, the line breaks every 20 ft under extensive use; therefore, new line must be continuously supplied. Even when used extensively, the cutting filament of the present invention can last up to about one year. The non-abradable polyurethane elastomer coating is extremely tough and durable, and the polyurethane elastomer coating and stainless steel core of the cutting filament of the present invention result in a superior cutting surface. The cutting assembly of the present invention substantially increases the cutting capabilities of conventional line trimmers, making it possible to edge and trim hard to reach areas that break conventional non-metallic lines.

It should be understood by those skilled in the art that various modifications and adaptations of the present invention as well as alternative embodiments of the present invention may be contemplated. The preferred embodiments of the present invention disclosed herein are intended to be illustrative only and are not intended to limit the scope of the invention. It is to be understood that the present invention is not limited to the sole embodiments described above, but encompasses any and all embodiments within the scope of the following claims.

What is claimed is:

1. A cutting head for a line trimmer for cutting vegetation comprising:

a hub having two diametrically opposite openings;

a segment of a cutting filament passing through said openings wherein said segment of said cutting filament extends externally beyond said hub; and said hub houses a cutting assembly comprising said cutting filament for cutting vegetation and a containment means for confining said cutting filament to said hub of the cutting head, wherein said containment means is a pair of crimps.

2. A cutting head according to claim 1 wherein:

said cutting filament is a hexagonal shaped nylon copolymer line.

3. A cutting assembly in combination with the hub of a cutting head of a line trimmer for cutting vegetation, said cutting assembly comprising:

a vegetation cutting means; and a containment means for confining said cutting means to the hub of the cutting head, wherein said containment means is a pair of crimps.

4. The combination according to claim 3 wherein:

said cutting means is a single hexagonal shaped nylon copolymer line.

* * * * *